Dec. 12, 1961   A. H. SPILLIAERT ET AL   3,012,648
BALE DELIVERY ASSEMBLY

Filed April 3, 1959   2 Sheets-Sheet 1

INVENTORS.
ANDRÉ HENRI SPILLIAERT
GEORGES HIGUET
BY
ATTORNEYS.

Dec. 12, 1961   A. H. SPILLIAERT ET AL   3,012,648
BALE DELIVERY ASSEMBLY
Filed April 3, 1959   2 Sheets-Sheet 2

INVENTORS.
ANDRÉ HENRI SPILLIAERT
GEORGES HIGUET
BY Wolfe, Hubbard, Voit & Osann
ATTORNEYS.

3,012,648
BALE DELIVERY ASSEMBLY
André Henri Spilliaert, Saint-Andre-lez-Lille, and Georges Higuet, Marquette-lez-Lille, France, assignors to Cie Massey-Ferguson, Marquette-lez-Lille, France, a company of France
Filed Apr. 3, 1959, Ser. No. 803,854
7 Claims. (Cl. 193—43)

The invention relates to machines for baling hay, straw and similar crops in the field and it is more particularly concerned with means for receiving the bales as they emerge from the baling chamber of the machine and for deliverying them to a discharge point.

The invention is particularly applicable to balers of the type adapted to be drawn through a field to pick up cut crop material and process it into firmly tied bales of convenient size. The bales produced by such machines are normally discharged in the rear of the baler by way of a chute or slide comprising a part of a bale delivery assembly attached to the baler. Usually, the bales are directed laterally and dropped to the ground at one side of the path traveled by the baler to insure a clear path for the baler in its next passage through the field.

In the operation of such apparatus the bales are pushed along the slideway in succession by the later produced bales as they are forced out of the baling chamber. As the bale movement thus produced is generally rearward, the delivery assembly is required to change the direction of motion to effect the desired side delivery. This entails a slight turning or slewing of the bales as their direction of motion changes. With delivery assemblies as heretofore constructed, difficulties are sometimes encountered as the bales may jam as they are turned or slewed and thus block the outlet from the baling chamber.

With the foregoing in view, one object of the invention is to provide an improved bale delivery assembly which completely eliminates the above mentioned difficulties.

Another object is to provide a bale delivery assembly embodying novel means for positively turning or slewing the bales so that they can be discharged laterally without any possibility of becoming jammed and blocking the discharge opening of the baler.

A more specific object is to provide a bale slewing mechanism adapted to be incorporated in the delivery assembly of a baler and including laterally spaced members engageable with the bales in their movement toward a discharge point to turn or slew the bales about a vertical axis and thus orient them for a smooth and easy change in the direction of movement.

Other objects and advantages of the invention will become apparent from the following detailed description of the preferred embodiment illustrated in the accompanying drawings in which.

Figure 1:
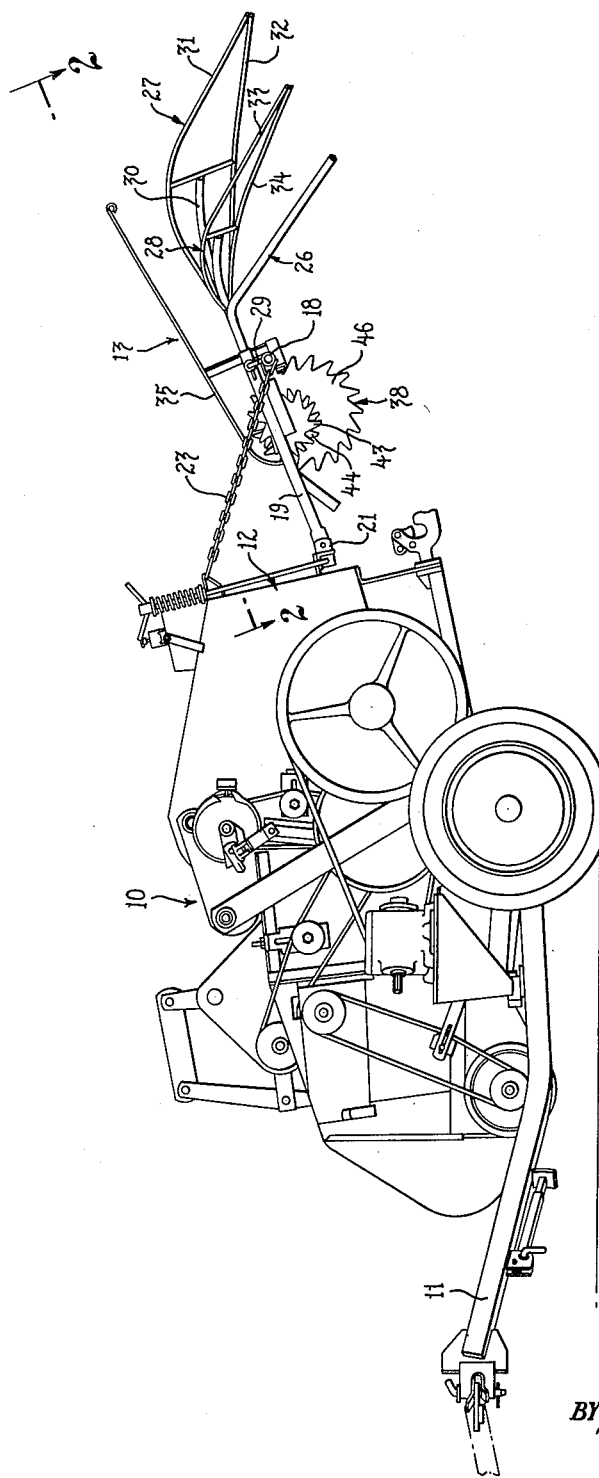
FIGURE 1 is a side view of a baler equipped with a bale delivery assembly embodying the features of the invention.
Figure 2:
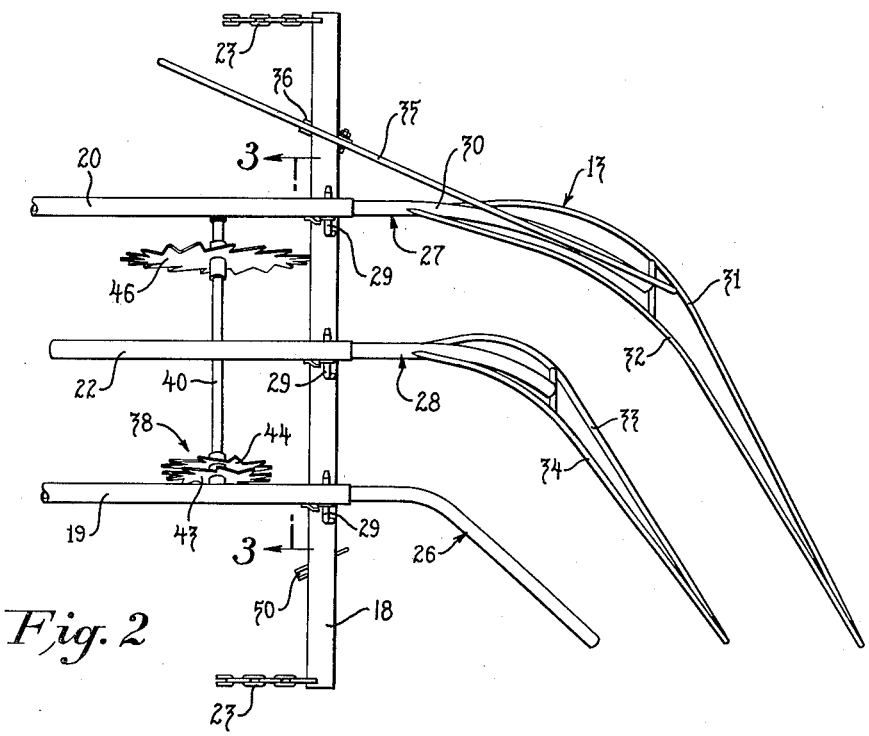
FIG. 2 is a fragmentary plan view of the delivery mechanism as viewed from a plane substantially on the line 2—2 of FIG. 1.
Figure 3:
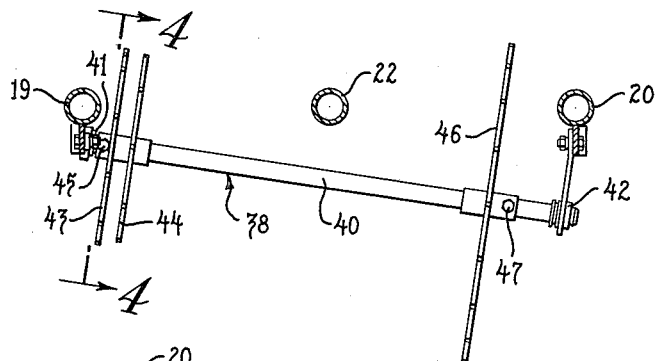
FIG. 3 is a fragmentary sectional view taken in a plane substantially on the line 3—3 of FIG. 2.

While a single preferred embodiment of the invention has been shown and will be described herein, there is no intention to limit the invention to details of the structure shown, the invention being to cover all modifications and adaptations falling within the spirit and scope of the invention as more broadly or generally characterized in the appended claims.

In the following description the terms "left" and "right" refer to the directions looking forward from the rear of the machine.

For purposes of illustration, the invention has been shown as embodied in a so-called "low density in-line baler," that is to say, a baler in which the crop flows straight through from the front to the rear, and the bales formed are of generally rectangular shape. In balers of this type, the bales are formed with their main or longest dimension transverse to the line of flow. It is to be understood, however, that the invention is also applicable to balers of the type in which the balers are formed with their longest dimension parallel to the line of flow.

The exemplary baler is a trailer type vehicle having a front drawbar 11 adapted to be hitched to a tractor in the customary manner. It will be undesrtood that balers of the type shown have a pick-up reel (not shown) laterally offset from the drawbar and operative to lift the cut crops from the ground and feed them to the baling mechanism as the baler travels through a field. The baling mechanism, which may be of any preferred construction, includes a baling chamber in which a plunger works to compress successive batches of the crop material and a knotter or wire twister ties the bales thus formed.

The formed and tied bales leave the baling chamber through an outlet 12, their movement being rearwardly or in the line of travel of the baler. For receiving the bales and conveying them to the desired delivery point, a delivery assembly 13 is provided as a rearward attachment to the baler. This assembly as shown defines a slideway for the bales including a straight section adjacent the baler with a curved section at its rear or delivery end. The straight section, in this instance, is made up of a transverse frame member 18 to which are secured two parallel laterally spaced forwardly extending members herein shown as tubes 19 and 20. At their forward ends, the tubes are formed for pivtal connection to brackets 21 on the baler frame just below and to the rear of the baling chamber outlet 12.

In the exemplary embodiment, an intermediate slideway member or tube 22 is arranged between the members 19 and 20 and parallel thereto. This intermediate member is also attached to the transverse member 18 and to a bracket on the baler frame. The members or tubes 19, 20 and 22 thus form an open supporting floor or slideway for the bales as they leave the baling chamber, the slideway being straight and extending in a rearward direction from the bale. Chains 23 connected between the cross member 18 and the upper portion of the baler frame support the assembly and determine its lower limit of pivotal movement.

To direct the discharge of the bales from the slideway laterally rather than to the rear of the baler, the curved section of the slideway is defined by delivery members 26, 27 and 28 connected respectively to the rear ends of the slideway members 19, 20 and 22. The delivery members, as shown, are tubular and are dimensioned at their forward ends to telescope into the tubular members 19, 20 and 22, thus forming sliding joints. Each of the members is secured in position and prevented from rotating relative to the associated member by a pin 29 passing through the connecting joint.

When the bales are to be discharged laterally to the left of the baler, the left hand member 26 of the curved slideway section is bent to the left and somewhat downwardly and rearwardly. The right hand member 27 is constructed in the form of a main tube 30 bent to the left adjacent its rear end. A pair of curved branch rods 31 and 32 are assembled with and welded or otherwise secured to the tube 30 so that the rod 31 forms a high bow as shown in FIG. 1. The intermediate member 28 is somewhat similar in construction to the member 27 but in this instance the curvature of the rods 33 and 34 which corresponds to the rods 31 and 32 of the outer member is such that the rod 33 forms a slightly lower bow. Accordingly, as the bales travel over the delivery members the right hand end of each bale is gradually lifted relative to the left hand end until the bale passes over the summits of the bow after which it will be free to slide downward and rearwards to the left.

In the particular delivery assembly shown, a guide rail 35 is provided for guiding the bales in their movements from the straight to the curved section of the slideway. As shown, the guide rail is attached by a bracket 36 to the transverse member 18 to extend rearwardly and to the left so as to lie above and just to the right of the delivery member 27. The rail is thus effective to engage and guide the right hand end of each bale in its rearward travel.

The delivery assembly 13 as above described is operative to direct the rearwardly traveling bales to the left. However, it has been found in practice that unless more positive leftward slewing is given to the bales, they tend at times to jam or pile up adjacent the junction of the two slideway sections and thus block the outlet of the baling chamber. This tendency is especially present when the bales are not spaced apart or when the delivery is at a greater speed at the side where the bales should fall—in this case, the left hand side due to the bales having an irregular shape.

In accordance with the invention this tendency of the bales to jam is completely eliminated by providing positively acting bale slewing mechanism 38 operative to turn or slew each bale about a vertical axis just before its right hand end reaches the guide rail 35. More particularly, the mechanism provided by the invention acts automatically to reorient the bales as they move from the straight to the curved section of the slideway so that resistance to their movement during this portion of their travel is materially reduced.

The slewing mechanism 38 in its preferred form includes a shaft 40 journaled in bearing brackets 41 and 42 depending from the tubes 19 and 20, respectively, adjacent the rear end of the straight slideway section. The bracket 42 on the tube 20 preferably extends substantially lower than the bracket 41. Thus, when the shaft 40 is mounted on the brackets, it extends below the slideway at an inclination downwards to the right. To effect the turning or slewing of the bales, the shaft 40 carries a pair of wheel-like bale engaging members positioned to engage the bale at laterally spaced points. Thus, one bale engaging member consisting in this instance of a pair of toothed discs 43 and 44 is secured as by a screw 45 to the left hand end of the shaft 40. Preferably the member is arranged close to the left hand or discharge side of the slideway. As will be seen by reference to FIG. 4, the discs 43 and 44 are arranged on the shaft so that their respective teeth are out of phase or staggered.

Figure 4:
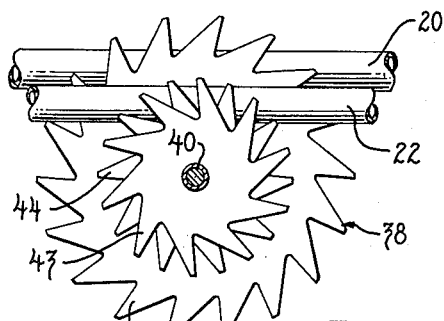
FIG. 4 is a fragmentary sectional view taken in a plane substantially on the line 4—4 of FIG. 3.

A second wheel-like bale engaging member 46 of larger diameter than the companion member is secured as by a screw 47 to the right hand end of the shaft 40. The member 46 is arranged close to the right hand side of the slideway. Due to the inclination of the shaft 40 the teeth of both wheels project upwardly beyond the level of the tubes 19, 20 and 22 to about the same extent and sufficiently to effect a substantial gripping engagement with the underside of the bales moving along the slideway. As shown in FIG. 4, the two bale engaging members are arranged with their teeth facing in opposite directions. More particularly, the arrangement is such that the teeth of the smaller member 43, 44 point forwardly, whereas those of the larger member 46 point rearwardly.

In the operation of the delivery assembly as each bale travels rearwardly, its left hand portion will engage the forwardly pointing teeth of the member 43, 44 and consequently will impart rotation to the shaft 40 and to the member 46. The rearwardly pointing teeth of the member 46, of course, engage the right hand portion of the bale. Due to the larger diameter of the member 46 its peripheral speed will be proportionately greater than the peripheral speed of the member 43, 44. That is to say, the teeth of the member 46 engaging the bale will move rearwardly at a greater speed than the teeth of the member 43, 44 are driven by the bale. Accordingly, the right hand end of the bale will advance faster than the left hand end, resulting in a turning or slewing of the bale to the left so that the right hand end can follow the curvature of the guide rail 35 with a minimum of friction. It will be understood that this positive slewing of the bale eliminates or minimizes the possibility of bales jamming in the delivery assembly and thus blocking the outlet of the baling chamber.

It will be apparent that the formation of the teeth of the bale engaging members produces a one-way drive. Thus, as regards the left hand member 43, 44 the drive is from the bale to the member. As regards the right hand member 46, the drive is from the member to the bale. The staggered arrangement of the teeth of the discs 43, 44 of the left hand member assures a more secure engagement and thus a continuous drive between the bale and the member.

In the exemplary embodiment, the delivery assembly and the bale slewing mechanism have been shown set for discharging the bales rearwardly and to the left of the path traveled by the baler. The construction provided by the invention is such that the parts can be quickly and easily detached and rearranged for delivery of the bales to the right of the baler if desired. To so rearrange the bale slewing mechanism, the bearing brackets 41 and 42 are removed to free the shaft 40 and the bale engaging members 43, 44 and 46 are removed from and remounted on the shaft in reversed order. The brackets 41 and 42 are then reattached to the slideway in reversed relation, that is, with the longer bracket 42 at the left side of the slideway and the shorter bracket 41 at the right side. With this arrangement, the bales in passing over the mechanism will be turned or slewed to the right.

As regards the curved section of the delivery assembly, removal of the joint pins 29 permits removal and interchange of the outer slideway members 26 and 27. Those members, as well as the intermediate member 28, are turned so that each extends rearwardly to the right. The members 19, 20 and 22, as well as the members 26, 27 and 28, are provided with suitable apertures to receive the pins 29 for retaining the members in either the right hand or left hand position. As a final step, the guide rail 35 is transferred from the clamp 36 at the right side of the slideway to a similar clamp 50 at the left side.

It will be apparent from the foregoing that the invention provides a delivery assembly of novel and advantageous construction for receiving the bales as they are produced by a baler and conveying them rearwardly and discharging them laterally to one side or the other of the baler. The improved mechanism is adapted to function without any jamming of the bales and consequent blocking of the baling chamber outlet by reason of the novel means provided for imparting a positive turning or slewing movement to the bales as their direction of movement changes from a rearward to a lateral direction. The slewing mechanism is simple in construction and positive in action. Furthermore, it is readily adapted for delivery of the bales at either side of the baler as desired.

We claim as our invention:

1. A bale delivery assembly for use with an agricultural baler, said assembly including a slideway comprising a straight section terminating at one end in a curved laterally directed section, means supporting the slideway with its other end positioned to receive a succession of bales discharged from the baler, and means disposed adjacent said one end of the straight slideway section coacting with two laterally spaced points on each bale and operative in response to bale movement for turning each bale about a vertical axis to facilitate its movement onto the curved section of the slideway.

2. A bale delivery assembly for use with an agricultural baler, said assembly including a slideway supported to receive the formed bales and along which they are pushed by later formed bales, said slideway comprising a straight section terminating at the end remote from the baler in a curved section operative to carry the bales and discharge them laterally of the path traveled on the straight section, and mechanism supported on said straight section engageable with the bales in their movement along the slideway at two points spaced apart laterally of the bales and operative in response to such movement to slew the bales around to facilitate their movement onto the curved section of the slideway.

3. A bale delivery assembly for use with an agricultural baler, said assembly including a slideway supported to receive the formed bales and along which they are pushed by later formed bales, said slideway comprising a straight section terminating at the end remote from the baler in a curved section operative to carry the bales and discharge them laterally of the path traveled on the straight section, a pair of rotatable members respectively disposed at opposite sides of said straight slideway section and positioned to be engaged by the bales in their movement along the slideway, one of said members being rotatably driven by the moving bales and being operative to drive the other member, said other member acting to impart a turning movement to each bale to facilitate its movement onto the curved section of the slideway.

4. A bale delivery assembly for use with an agricultural baler, said assembly including a slideway supported to receive the formed bales and along which they are pushed by later formed bales, said slideway comprising a straight section terminating at the end remote from the baler in a curved section operative to carry the bales and discharge them laterally of the path traveled on the straight section, a pair of generally circular toothed members fixed to a common shaft, means supporting said shaft with said members disposed adjacent opposite sides of the straight slideway section in position to be driven through engagement with the bales in their movement along the slideway, one of said members being of larger diameter than the other member to adapt it for imparting a turning movement to each passing bale and thereby facilitate its movement onto the curved section of the slideway.

5. A bale delivery assembly for use with an agricultural baler, said assembly including a slideway supported to receive the formed bales and along which the bales are adapted to be moved, said slideway comprising a straight section terminating at the end remote from the baler in a curved section operative to carry the bales and discharge them laterally of the path which they travel on the straight section, a pair of toothed discs fixed to a common shaft and spaced apart axially of the shaft, bearing brackets supporting said shaft below the straight section of the slideway, one of said discs being of substantially larger diameter than the other disc, said brackets being dimensioned to support said shaft in an inclined position such that the upper edge portions of the discs project above the slideway to the same extent and at opposite sides of the slideway for engagement with the passing bales, the smaller of the disc being rotatably driven by the moving bales and serving to drive the larger of the discs to impart a greater movement to the ends of the bales engaged by such larger disc whereby the bales are slewed around to facilitate their movement onto the curved section of the slideway.

6. A bale delivery assembly as defined in claim 4 in which the toothed member of smaller diameter comprises a pair of discs spaced apart axially of the shaft and fixed thereto with their teeth disposed in staggered relation.

7. A bale delivery assembly for use with an agricultural baler, said assembly including a slideway supported to receive the formed bales and along which the bales are adapted to be moved, said slideway comprising a straight section terminating at the end remote from the baler in a curved section operative to carry the bales and discharge them laterally of the path which they travel on the straight section, a pair of toothed discs fixed to a common shaft and spaced apart axially on the shaft, bearing brackets supporting said shaft below the straight section of the slideway, one of said discs being of substantially larger diameter than the other disc, said brackets being dimensioned to support said shaft in an inclined position such that the upper edge portions of the discs project above the slideway to the same extent at opposite sides of the slideway for engagement with the passing bales, the disc of smaller diameter being mounted with its teeth facing the baler to insure driving of the disc assembly by the moving baler, and the disc of the larger diameter being mounted with its teeth facing away from the baler for imparting positive advancing movements to the bales driving the companion disc.

References Cited in the file of this patent

UNITED STATES PATENTS

| | | |
|---|---|---|
| 1,756,653 | McArthur | Apr. 29, 1930 |
| 2,529,842 | Jones et al. | Nov. 14, 1950 |
| 2,718,960 | Standal | Sept. 27, 1955 |